Feb. 13, 1934.  F. W. BLANCHARD  1,947,377
LIGHT PROJECTING LAMP FOR LOCOMOTIVE CABS
Filed Feb. 15, 1932  3 Sheets-Sheet 1

INVENTOR
FREDERICK W. BLANCHARD
BY J. D. O'Connell
ATTORNEY

Feb. 13, 1934.   F. W. BLANCHARD   1,947,377
LIGHT PROJECTING LAMP FOR LOCOMOTIVE CABS
Filed Feb. 15, 1932   3 Sheets-Sheet 2
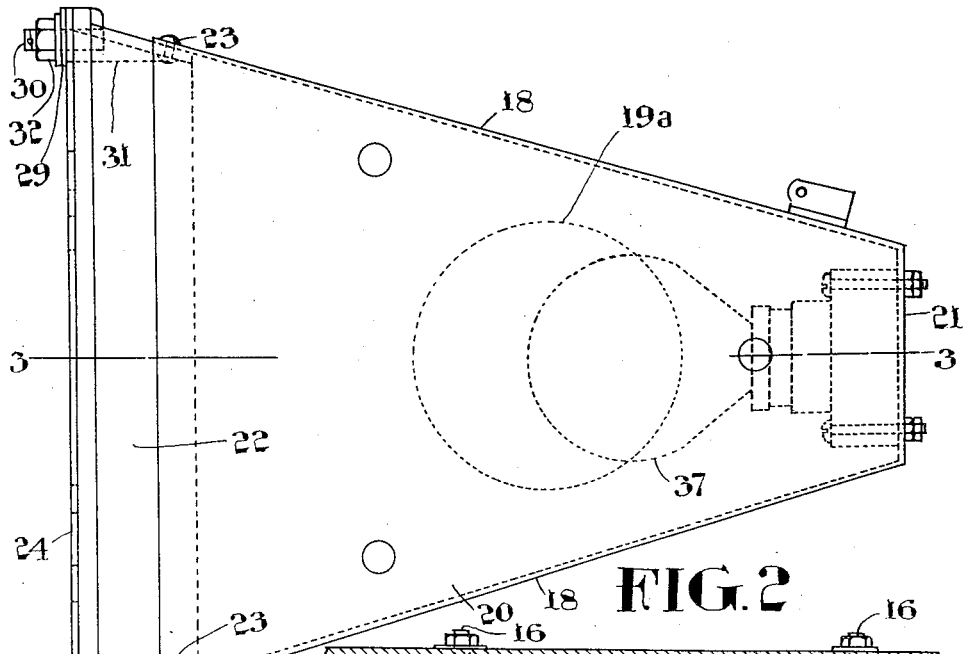
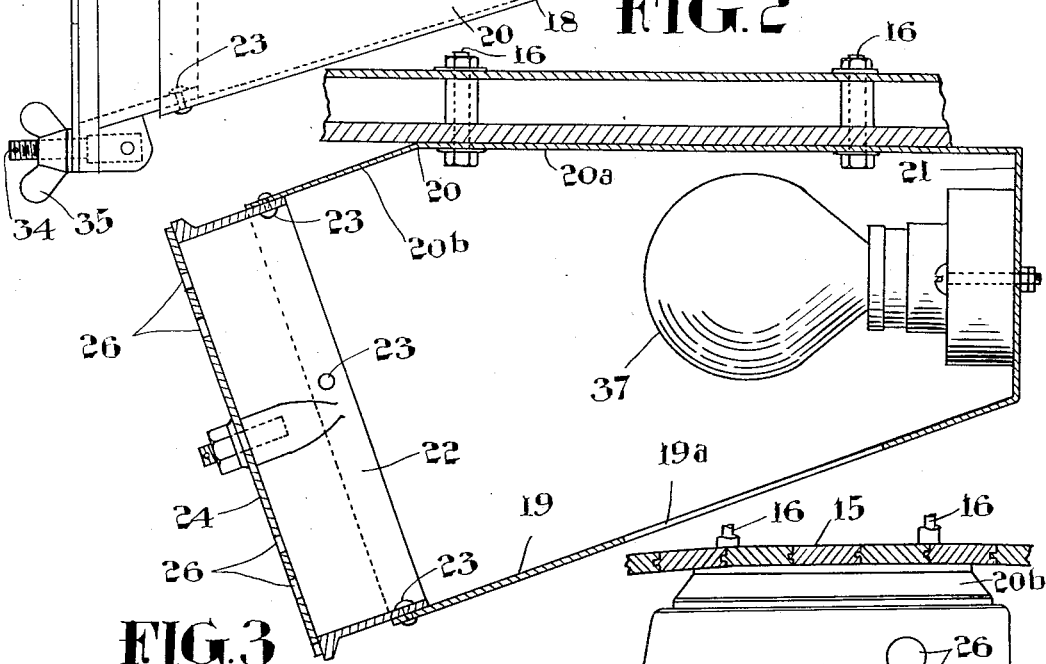
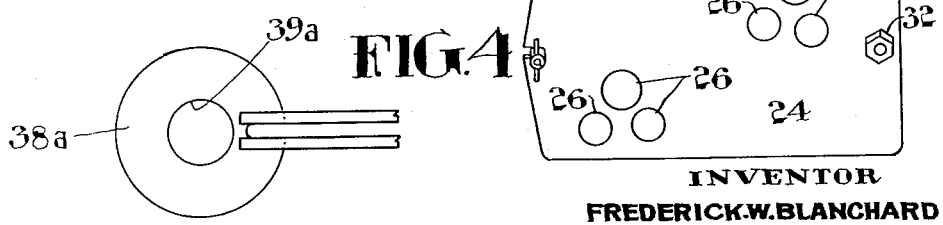
INVENTOR
FREDERICK W. BLANCHARD
BY J. F. O'Connell
ATTORNEY Feb. 13, 1934.   F. W. BLANCHARD   1,947,377
LIGHT PROJECTING LAMP FOR LOCOMOTIVE CABS
Filed Feb. 15, 1932   3 Sheets-Sheet 3

INVENTOR
FREDERICK W. BLANCHARD
BY J. T. O'Connell
ATTORNEY

Patented Feb. 13, 1934

1,947,377

UNITED STATES PATENT OFFICE 1,947,377

LIGHT PROJECTING LAMP FOR LOCOMOTIVE CABS

Frederick W. Blanchard, Montreal, Quebec, Canada, assignor to T. McAvity & Sons Limited, Montreal, Quebec, Canada Application February 15, 1932. Serial No. 593,070

5 Claims. (Cl. 240—7.1)

This invention relates to light projecting lamps and provides an improved type of lamp particularly useful for illuminating the floor and rear portion of a locomotive cab and the various steam gauges and other indicating instruments arranged therein.

The lamp provided in accordance with this invention is arranged in the upper rear portion of the cab and has a series of light emitting openings including a bottom opening for illuminating the floor and rear portion of the cab and a plurality of front openings for illuminating the various indicating instruments, the design and location of said front openings being carefully predetermined to project the light rays on the indicating instruments in such manner as to avoid excessive illumination or objectionable glare from the backhead of the locomotive boiler or from other light reflecting surfaces outside the areas actually occupied by the indicating instruments.

Another feature of the invention consists in the provision of novel means for determining the correct location of the front openings so that the beam of light projected through each opening is centered on and substantially confined to the area occupied by a particular indicating instrument or to a restricted area occupied by a group of instruments when, as sometimes occurs, certain of the instruments are closely grouped together in a relatively small area so that there is no substantial area of light reflecting surface exposed between the component elements of the group.

Proceeding now to a more detailed description of the invention, reference will be had to the accompanying drawings wherein—

Figure 2 is a top plan view of the lamp assembly.

Figure 3 is a longitudinal sectional view taken along the line 3—3 of Fig. 2.

Figure 4 is a front view of the lamp showing the front openings through which the light rays are projected on the different indicating instruments arranged on the back boiler head of the locomotive.

Figure 10 is a fragmentary view of a modified mask or finder.

Referring more particularly to the drawings, 11 designates the interior of a locomotive cab equipped with the usual steam gauges and other indicating instruments appearing at 12, these instruments being usually arranged in the front portion of the cab and carried by the backhead 13 of the locomotive boiler 14.

Figure 5:
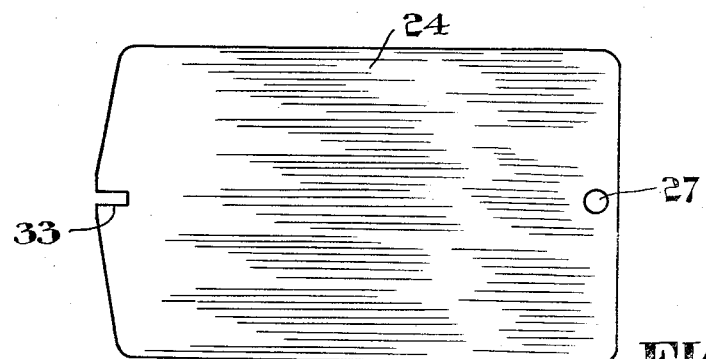
Figure 5 is a view in front elevation of the front cover plate of the lamp as it appears prior to the formation of the front openings therein.
Figure 6:
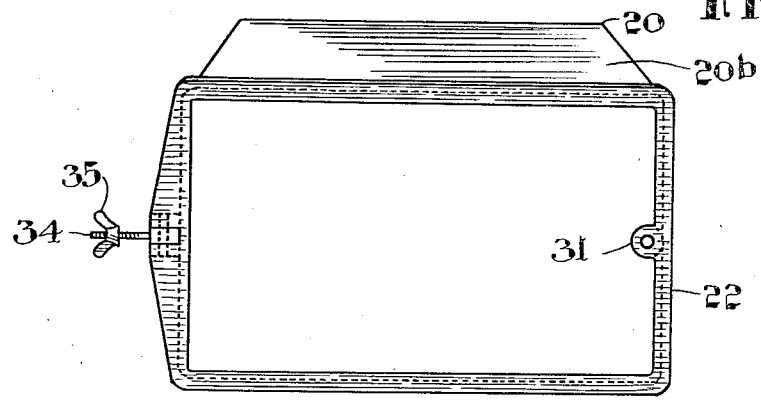
Figure 6 is a front view of the lamp casing with the front cover plate removed.
Figure 9:
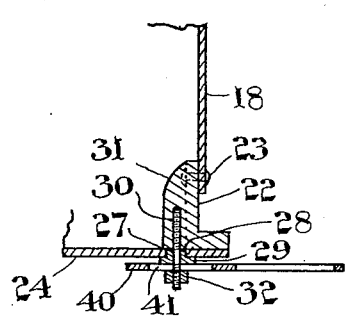
Figure 9 is a fragmentary sectional view taken along the line 9—9 of Fig. 8.

My improved lamp is arranged in the upper rear portion of the cab and is supported from the cab roof 15 by any suitable arrangement of supporting bolts 16. As shown to advantage in Figs. 2 to 4 inclusive, this lamp comprises a relatively thin metal casing presenting side walls 18, a bottom wall 19, a top wall 20, and a rear wall 21, the front end of the casing being open and reinforced by an inserted cast metal frame 22 of rectangular configuration, said frame 22 being riveted or otherwise secured to the casing as indicated at 23. The frame 22 carries the front cover plate 24 which is provided with a plurality of front openings 26 through which beams of light are concentrated on the indicating instruments 12 as illustrated to advantage in Fig. 1. In the present instance the cover 24 is provided at one end with an opening 27 (see Figs. 5 and 9) in which is mounted a bushing 28 having a flange 29 at its outer end overlying the outer surface of the cover around the edge of the opening 27. This bushing 28 is supported on a stud 30 having its inner portion secured in a socket 31 formed in the cast frame 22 and having its outer portion equipped with a clamping nut 32 which, in the assembly shown in Figs. 1 to 3 inclusive, is screwed up against the flange of the bushing 28 in order to hold the bushing in place as a pivot for the cover 24. The other end of the cover 24 is provided with a slot 33 adapted, when the cover is positioned over the front opening of the lamp casing, to receive the threaded shank of a bolt 34 pivoted to the frame 22, said bolt being equipped with a wing nut 35 adapted to be tightened against the outer surface of the cover.

Figure 1:
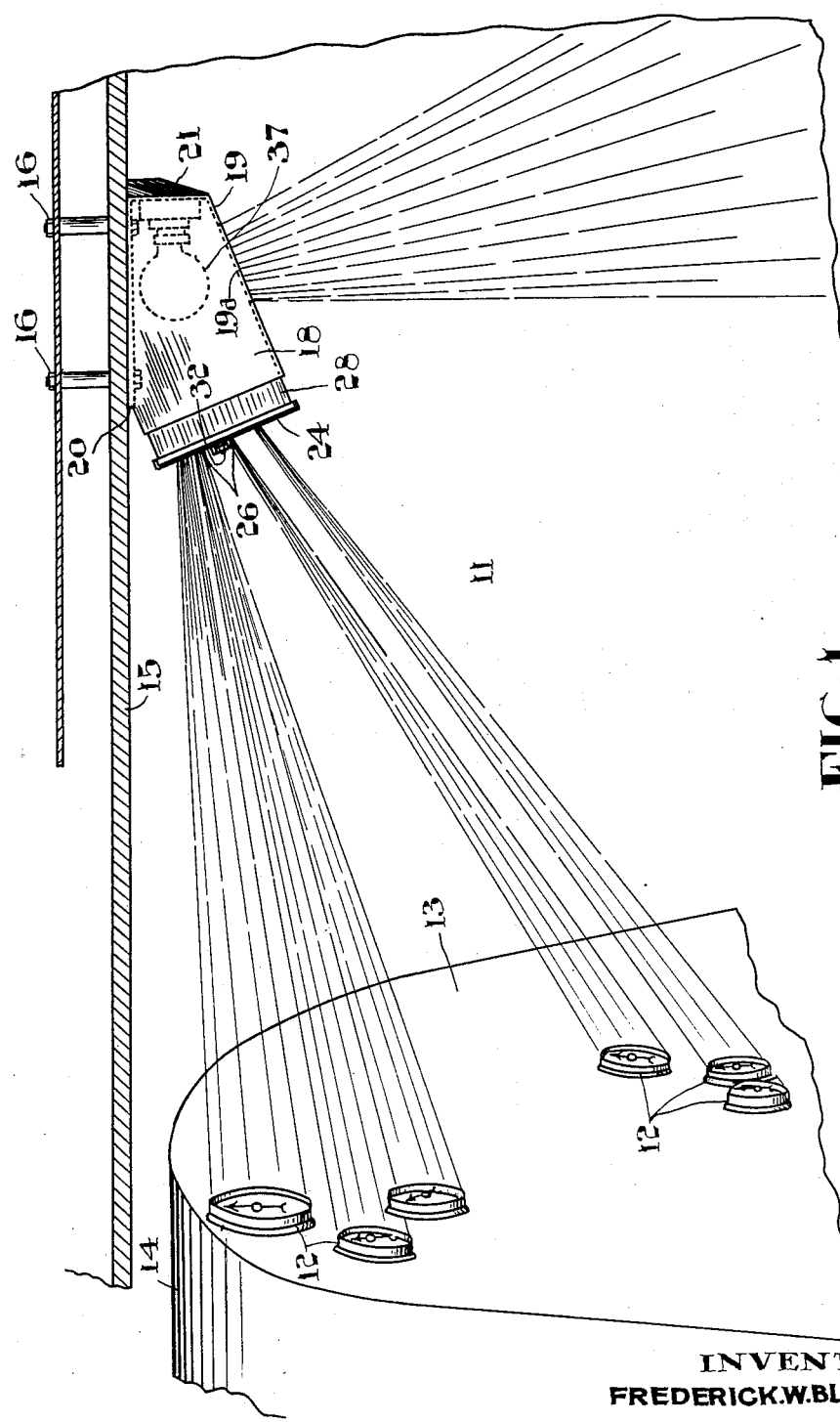
Figure 1 is a fragmentary sectional view of a locomotive cab equipped with a lamp constructed and arranged in accordance with this invention.

A point source of light such as an incandescent bulb 37 is arranged in the lamp casing, as shown to advantage in Figs. 1, 2 and 3 and the openings 26 of the front cover plate 24 are so located with reference to the source of light and the indicating instruments 12 as to cause the beam of light projected through each of said openings to be centered on and substantially confined to the area occupied by one of the indicating instruments 12 thereby preventing excessive distribution of the projected light rays over portions of the boiler head 13 lying outside the areas occupied by the instruments 12. In some cases, where a plurality of the instruments 12 are closely grouped together in a restricted area so that the amount of light reflecting surfaces exposed between the component instruments of the group is practically negligible, it is possible to form and locate a single opening in the cover plate 24 so that the beam of light projected through this opening will be accurately projected on all members of such group without excessive illumination of the boiler head such as ordinarily interferes with the vision of the engineer.

Figure 7:
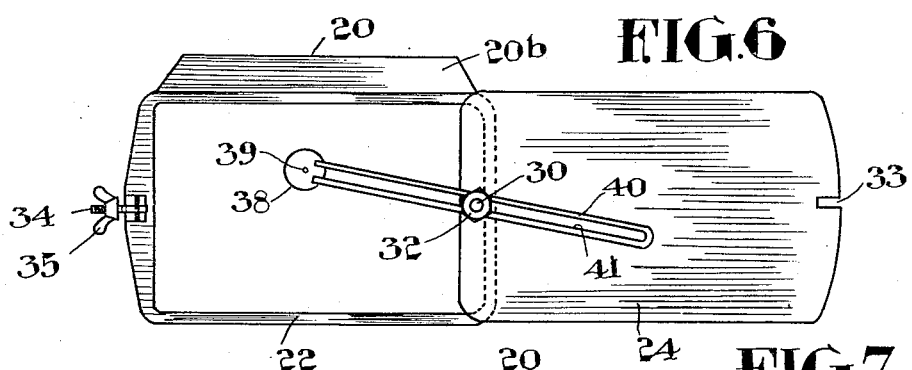
Figure 7 is a front view of the lamp casing showing the manner in which the finder or mask is applied thereto for the purpose of determining the correct location of the openings to be formed in the front cover plate which is shown in a laterally displaced position.
Figure 8:
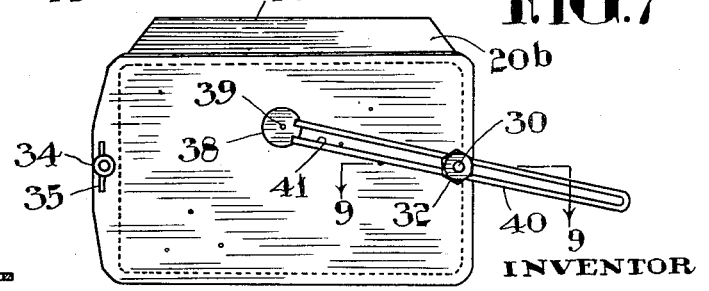
Figure 8 is a view similar to Fig. 7 but showing the cover occupying its proper position over the front opening of the lamp casing so that the mask or finder may be utilized as a guide for marking on the front cover plate the location of one of the openings to be formed therein.

The correct location of the openings to be formed in the front cover plate 24 is preferably predetermined by use of the mask or finder illustrated in Figs. 7 to 8 inclusive. This mask or finder is herein shown as comprising an opaque disk 38 having a relatively small central opening 39. This disk is carried at one end of a guide bar 40 which is mounted for sliding and swinging movement on the cover supporting stud 30, said guide bar being confined between the nut 32 and the flange 29 of the bushing 28 and being provided with a longitudinally extending slot 41 through which the stud 30 extends. The lamp casing, with the cover 24 and the disk 38 assembled therewith, is initially mounted in the upper rear portion of the cab as indicated in Fig. 1, the cover 24 at this time occupying a laterally displaced position such as that shown in Fig. 7 so that the light emanating from the open front of the casing is directed upon the backhead 13 of the locomotive boiler. The guide bar 40 is then moved relatively to the stud 30 until the shadow of the disk 38 is centered on and substantially confined to the area occupied by one of the instruments 12. Assuming the position then occupied by the disk 38 to be that shown in Fig. 7, the disk is secured in this position by tightening of the nut 32 and the cover plate 24 is then swung from the position shown in Fig. 7 to the position shown in Fig. 8. In the assembly shown in Fig. 8 the disk serves as a marker indicating the position of the opening to be formed in the front plate in order that the beam of light projected through said opening may be centered on and substantially confined to the indicating instruments shadowed by the disk. When swung to the position shown in Fig. 8 the cover is secured in place by means of the swinging bolt 34 and wing nut 35 and the disk 38 is then employed as a guide for indicating on the cover the center of the opening to be formed therein, the center of said opening being conveniently indicated by making a mark on the cover through the central opening 39 of the disk.

The procedure outlined herein is repeated in connection with the location of each of the remaining openings to be formed in the front cover 24, the cover being arranged in the laterally displaced position shown in Fig. 7 during the period that the mask or disk is manipulated to center its shadow on the particular instrument to be illuminated and being subsequently swung to the position shown in Fig. 8 so that the position of the opening as determined by manipulation of the mask may be conveniently indicated thereon. After the location of the centers of all openings 26 to be formed in the cover has been determined the cover and finder are removed from the lamp casing and the cover drilled in accordance with the markings thereon. The cover is then reapplied to the lamp casing and secured over the front opening by means of the nut 35.

While the design of the lamp casing may be varied to a considerable extent, I prefer to use the specific construction shown in the present drawings. In this connection it will be noted that the bottom wall 19 of the lamp casing slopes downwardly and forwardly from the rear wall 21 and that both the bottom wall 19 and the top wall 20 gradually increase in width towards the front end of the lamp casing. The side walls 18 are inclined to converge inwardly towards the rear wall so that the casing, as a whole, is made of gradually increasing width towards its front end. It will also be noted that the major portion 20a of the top wall 20 is substantially horizontal and secured to the cab roof 15 by means of the bolts 16, the front portion 20b of said top wall being sloped downwardly at an angle corresponding to the slope of the bottom wall 19. By reason of this last mentioned construction the axis of the front opening of the casing is inclined with respect to the vertical so as to direct the light rays downwardly onto the backhead 13 of the locomotive boiler.

The bottom wall 19 is herein shown as provided with a relatively large opening 19a through which sufficient light is projected to adequately illuminate the floor and rear portion of the cab. This opening 19a may, however, be replaced by any suitable number of smaller openings.

Instead of employing the mask shown in Figs. 7 and 8 I may employ a modified mask of the type shown in Fig. 10. In this case the mask consists of a disk 38a having a relatively large central opening 39a. This disk 38a is mounted in the same manner as the disk 38 and is manipulated in front of the lamp casing until the beam of light projected through the opening 39a is centered on a restricted area occupied by one or a group of the instruments 12. When the disk 38a is held in this position the cover plate 24 is arranged over the open end of the lamp casing so that by drawing a circle on the cover around the inner edge of the opening 39a or by painting the portion of the cover exposed through said opening the center of the opening to be formed in the cover coincides with the center of the circle or painted area.

In the foregoing I have described what I now consider to be the preferred embodiment of this invention but it will be understood that various changes in the construction and arrangements of parts may be resorted to within the scope and spirit of the appended claims. It will also be understood that the invention is not limited in its application to the illumination of indicating instruments arranged in a locomotive cab but may be used in other relations for effecting similar illumination of various objects arranged in front of the lamp casing.

Having thus described my invention, what I claim is:—

1. Means for illuminating the indicating instruments mounted on the back boiler head of a locomotive cab comprising a lamp casing mounted in the upper rear portion of the cab and having a source of light mounted therein, said casing presenting a bottom wall sloping downwardly towards the front of the casing and a generally horizontal top wall having a portion thereof at the forward end sloping downwardly at an angle corresponding to the slope of the bottom wall, and a front plate closing the forward end of the casing and inclined so that its lower edge is disposed rearwardly of its upper edge, said plate being provided with openings through which beams of light are projected downwardly and forwardly onto the aforesaid instruments.

2. A locomotive cab lamp of the character described comprising a lamp casing presenting wall members including vertical side and end walls, a bottom wall sloping downwardly towards the front end of the casing, a top wall having a portion thereof at the forward end sloping downwardly to lie in a plane substantially parallel with the bottom wall, the remaining portion of the top wall being substantially horizontal and of a length substantially equal to the length of the bottom wall, and a front wall closing the forward end of the casing and provided with apertures, said front wall being vertically inclined so that the axis of each aperture is substantially parallel with the bottom wall.

3. A lamp as recited in claim 2 in which the width of the top and bottom walls and the spacing of the side walls gradually increase towards the front end of the casing.

4. The combination with a locomotive cab of a lamp casing mounted in the upper rear portion thereof, said casing presenting wall members including vertical side and end walls, a bottom wall sloping downwardly towards the front end of the casing, a top wall having a portion thereof at its forward end sloping downwardly to lie in a plane parallel with the sloping bottom wall, the remaining portion of said top wall being substantially horizontal and secured to lie flat against the roof structure of the cab, the overall length of said top wall being greater than that of the bottom wall so that the front edge of the top wall lies in a vertical plane forwardly of the front edge of the bottom wall, the front edges of the side walls being flush with and perpendicular to the corresponding edges of the top and bottom walls whereby these edges of the side walls incline downwardly and rearwardly as they approach the bottom wall, and a vertically inclined front wall flatly engaged with the front edges of said top, bottom and side walls and having one or more light emitting openings formed therein.

5. A locomotive cab lamp of the character described comprising a lamp casing presenting top, bottom, side and rear walls, said casing being open at the front end, a threaded stud projecting from the front edge of one of said side walls, a front cover plate for said opening provided, adjacent one end, with an opening receiving said stud therethrough, a bushing in said opening surrounding said stud and having a retaining flange at its outer end overlying the cover plate, a removable member threaded on the outer end of the stud adapted to clamp the bushing to the side wall by which the stud is carried, said bushing serving as a pivot about which the cover may be swung to or from a position closing the front of the casing, and means for detachably securing said cover plate in a position closing the front end of the casing.

FREDERICK W. BLANCHARD.